United States Patent
Ziegler

(10) Patent No.: US 8,830,838 B2
(45) Date of Patent: Sep. 9, 2014

(54) NODE INTERFACE INDICATORS

(75) Inventor: Michael L. Ziegler, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 223 days.

(21) Appl. No.: 13/232,645

(22) Filed: Sep. 14, 2011

(65) Prior Publication Data

US 2013/0064140 A1 Mar. 14, 2013

(51) Int. Cl.
*G06F 11/10* (2006.01)
*G06F 15/16* (2006.01)
*H04L 1/18* (2006.01)
*H04L 1/16* (2006.01)

(52) U.S. Cl.
CPC .................................. *H04L 1/1607* (2013.01)
USPC ........... 370/236; 370/230; 709/228; 709/231; 714/748

(58) Field of Classification Search
USPC ....................... 370/229–230.1, 232, 235, 236; 709/228, 231; 714/18, 748
See application file for complete search history.

(56) References Cited

U.S. PATENT DOCUMENTS

| | | | |
|---|---|---|---|
| 4,764,918 A * | 8/1988 | Waters .......................... | 370/250 |
| 6,788,686 B1 | 9/2004 | Khotimsky et al. | |
| 7,355,975 B2 | 4/2008 | Liu et al. | |
| 7,359,318 B2 | 4/2008 | Abel et al. | |
| 7,477,644 B2 | 1/2009 | Georgiou et al. | |
| 7,660,316 B2 * | 2/2010 | Warren et al. ................. | 370/401 |
| 7,995,594 B2 * | 8/2011 | Capone et al. ................ | 370/401 |
| 2004/0141521 A1 * | 7/2004 | George ......................... | 370/463 |
| 2004/0190540 A1 * | 9/2004 | Miyake et al. ................ | 370/428 |
| 2006/0045068 A1 * | 3/2006 | Wu et al. ....................... | 370/352 |
| 2009/0059788 A1 * | 3/2009 | Granovsky et al. ........... | 370/235 |
| 2010/0014428 A1 | 1/2010 | Naven et al. | |
| 2012/0064838 A1 * | 3/2012 | Miao et al. ..................... | 455/73 |
| 2012/0079101 A1 * | 3/2012 | Muppala et al. .............. | 709/224 |

OTHER PUBLICATIONS

Zinner, T. et al., Performance Evaluation of Packet Re-ordering on Concurrent Multipath Transmissions for Transport Virtualization, http://www.itcspecialistseminar.com/paper/itcss09_Zinner.pdf.

* cited by examiner

*Primary Examiner* — Redentor Pasia

(57) ABSTRACT

Techniques described herein provide for sending data packets from source to destination nodes. Indicators, such as counters, may determine the configuration of node interfaces. The data packets may be sent based on a comparison of current and stored indicators.

16 Claims, 6 Drawing Sheets

n. For purposes of clarity, only one node 110-1 is shown in detail in FIG. 1, however it should be understood that there may be any number of nodes, all of which have a generally identical structure.

NODE INTERFACE INDICATORS

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

DETAILED DESCRIPTION

Figure 1:
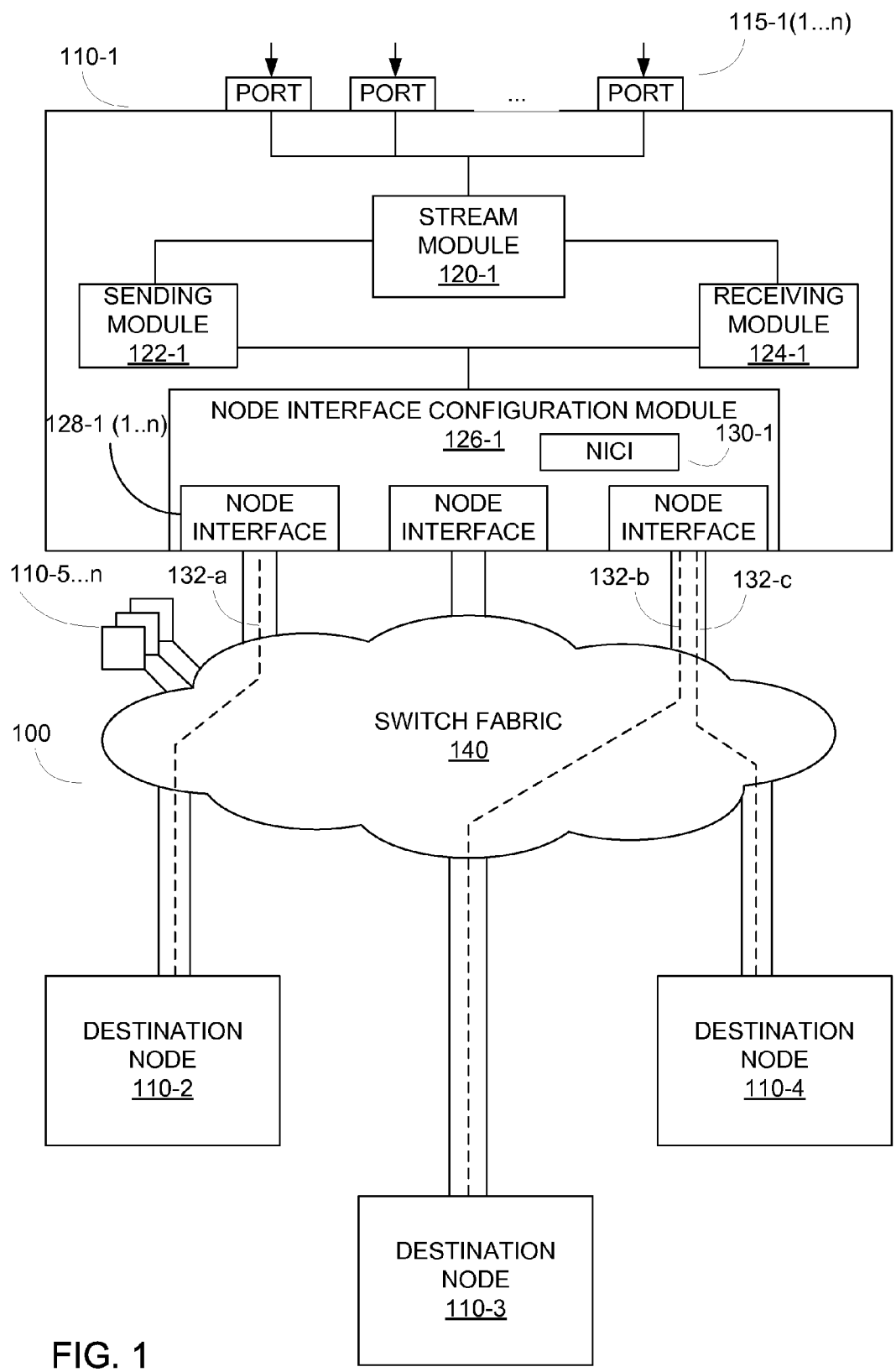
FIG. 1 is a high level block diagram of an example of a network device.

In many cases, it is desirable that an order between data packets be maintained. In other words, the data packets should be delivered to the destination node in the same order in which they were received by the source node. One way to achieve an ordered delivery is through the use of a communications channel. A characteristic of a communications channel may be that data packets that are input to a communications channel at the source node are delivered to the destination node in the same order as they were input. A communications channel may be designated for communications between a source node and a destination node for each set of data packets, which can also be referred to as a stream, that are to be delivered in order. Thus, as long as the data packets that make up a stream are input to the designated communications channel in order, it can be ensured that the data packets will be received by the destination node in order.

However, a problem may arise when there is a need to change designated communications channels. For example, a communications channel may be taken out of service for maintenance. As another example, a communications channel may be taken out of service to reduce overall power consumption of the networking device. It is not possible to simply designate a different communications channel as the new designated communications channel. The reason for this is that there is no ordering guarantee for data packets sent over different communications channels. For example, a data packet may have been sent over a first designated communications channel and that channel may subsequently be taken out of service. The next data packet cannot simply be sent over a different communications channel because there can be no guarantee that the second data packet will not be received at the destination node before the first data packet.

Further exacerbating the problem is that a stream of data packets may be sent to more than one destination node. For example, a stream of data packets may be sent to two different destination nodes. The stream may use a different designated communications channel for each of the destination nodes. If one of the designated communications channels is taken out of service, the problem described above occurs. In addition, a new problem arises because data packets cannot be sent to the destination node whose designated communications channel has been taken out of service until a new channel is selected, while they can be sent to the other destination node. While it may be possible to keep track of which individual destinations are affected by a change in communications channel status, the additional overhead required to do so may be unwarranted.

Example embodiments described herein overcome these problems by maintaining a status of the communications channels on a node. If there is a change to the status of any of the communications channels on a node, data packets will no longer be sent from that node for any streams that currently have any data packets "in flight" to any destination node, regardless of the communications channels being used by those streams. Once it can be assured that selection of a new designated communications channel for each stream, if needed, will not result in any packets being delivered out of order, the sending of data packets to the destination nodes may be resumed.

FIG. 1 is a high level block diagram of an example of a network device. The network device 100, such as a switch or router, may implement the example techniques described herein to overcome the problems described above. The network device may include a plurality of nodes 110-1 . . . n. For purposes of clarity, only one node 110-1 is shown in detail in FIG. 1, however it should be understood that there may be any number of nodes, all of which have a generally identical structure. Furthermore, all nodes are capable of both sending and receiving packets, and may be doing so simultaneously. However, for ease of description, FIG. 1 will be described in terms of a source node 110-1 which may receive data packets from external sources and send those data packets to destination nodes 110-2,3,4. The destination nodes may receive the data packets and respond with an acknowledgement of the receipt. It should be understood that in operation, a node may act as both a source node and a destination node at the same time for different data packets or even for the same packet.

Source node 110-1 may include a plurality of ports 115-1(1 . . . n). Ports 115-1 may be used to connect to external sources of data packets, such as computers, servers, or even other network devices. The source node 110-1 may receive data packets from these external sources through the ports. The number of ports that exist on a source node may be determined by the design of the network device. For example, in some modular switches, capacity may be added by inserting an additional line card containing 4, 8, 16, or 32 ports. The line card may also contain a node chip to control the data packets sent to and received from the ports. In some cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The source node 110-1 may include a stream module 120-1, a sending module 122-1, a receiving module 124-1, and a node interface configuration module 126-1. The stream module 120-1 may receive all the data packets received from the ports 115-1. The stream module may then classify the data packets into streams. A stream is an ordered set of data packets that may be output in the same order as exists within the stream. There may be many streams on each node. For the present example, the criterion used to classify data packets into streams is unimportant. What should be understood is that a stream may be a set of data packets in a specified order. These data packets should be received by destination nodes in the same order as they exist in the stream. As the stream module 120-1 receives data packets from the ports 115-1, the data packets are added to a stream and stored in memory. Any form of suitable memory, such as static or dynamic random access memory (SRAM/DRAM), FLASH memory, or any other memory that is able to store data packets, may be used.

The sending module 122-1 may be notified of data packets as they are added to a stream. The sending module may determine to which destination nodes a data packet will be sent. The sending module may also interface with a node interface configuration module 126-1 to determine which communications channel may be used by the stream to send the data packet to the determined destination nodes. Also included is a receiving module 124-1. The receiving module may be used to receive acknowledgements from a destination node that a data packet has been received.

The node interface configuration module 126-1 may include one or more node interfaces 128-1(1 . . . n). Each node interface may include a communications link to a switch fabric 140. Although depicted as separate physical links, it should be understood that there may also only be one physical link to the switch fabric, with multiple logical communications links defined within the single physical interface. In other words, regardless of physical implementation, a node interface represents an entry point into the switch fabric.

The node interface configuration module may maintain a status of each destination node which indicates which destination nodes may be reached when using a specific node interface. An example of a data structure used to maintain such a status is described below with respect to FIG. 3. The node interface configuration module may also include a node interface configuration indicator (NICI) 130-1. The NICI may be used to determine whenever there is a change in the reach-ability of a destination node through a node interface. For example, if a destination node is no longer reachable when using a specific node interface, the NICI may be updated, as the configuration has changed. In an example implementation, the NICI may be implemented as a counter. Each time a change in the configuration status of the node interfaces occurs, the counter may be incremented. In one example implementation, the NICI may be implemented as a modulus one counter, which effectively turns the NICI into a toggle field which is toggled each time there is a change in the node interface configuration status. Regardless of implementation, the NICI may be used to determine when there has been a change in the configuration of the node interfaces.

The switch fabric 140 may be used to connect the nodes 110-1 . . . n. The switch fabric may receive messages from a source node 110-1 through one of the node interfaces 128-1(1 . . . n) and may route those messages to destination nodes 110-2,3,4. The destination nodes 110-2,3,4 may also contain a node interface configuration module (not shown) and associated communications links The combination of a communications link on the source node, a path through the switch fabric, and a communications link on a destination node may form a communications channel 132-1 ($a,b,c$). A characteristic of a communications channel may be that messages sent over the channel may be received in the order sent. No such guarantee exists for messages sent using different communications channels, and those messages may be received in any order.

A specific communications channel is designated for each stream on the source node 110-1 for each destination node. For example, a designated communications channel 132-$a$ may be used for all messages for the stream that is being described in this example when the messages are being sent to destination node 110-2. Similarly, communications channels 132-$b,c$ may be the designated communications channels for messages that are being sent to destination nodes 110-3,4 respectively for the same stream.

The designated communications channel may be determined based on the node interface configuration status. For example, if a source node sends a data packet from a stream to a given destination node, the designated communications channel may be determined by an algorithm that takes as an input the current node configuration status and outputs a designated node interface. If there are no changes to the node interface configuration, the algorithm should result in the same node interface being selected each time. The specific algorithm used is unimportant, so long as a static node interface configuration results in the same node interface being selected. The source node may then use the selected node interface, and thus the designated communications channel, to send the data packet.

If the node interface configuration remains static, the same node interface may always be selected for transmission of a data packet from a given stream to a given destination node. Thus, because the data packets will be sent over the same communications channel, the data packets will be received in the order that they were sent. However, if there is any change in the node interface configuration status, there is no longer a guarantee that the same node interface will be selected. The NICI may be used to determine when there has been a change in the node interface configuration. Use of the NICI to recover in cases where there has been a change in the node interface configuration status will be described in further detail below.

Figure 2:
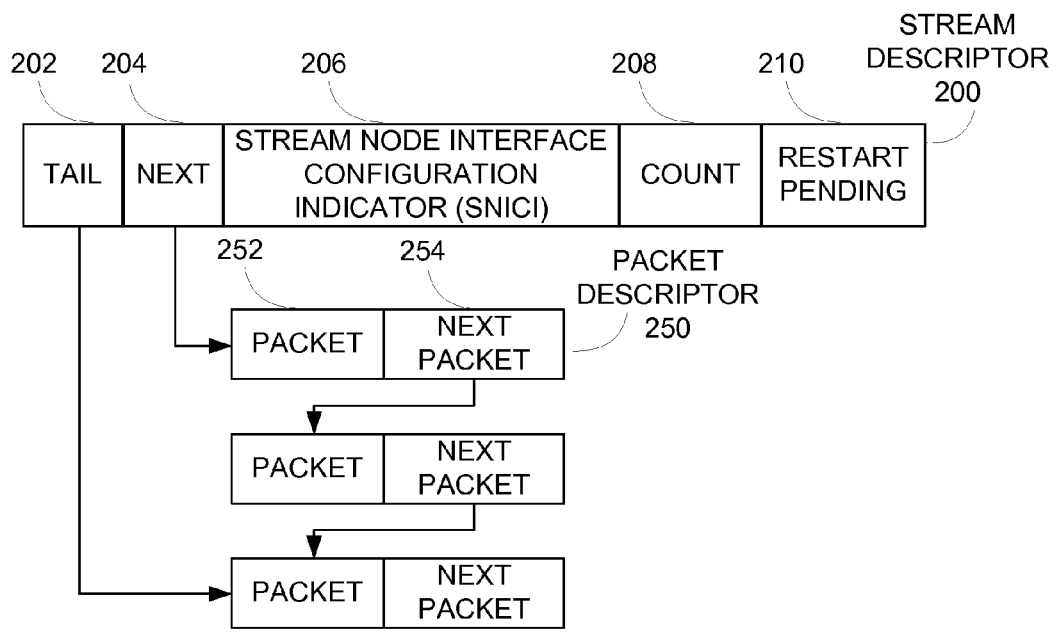
FIG. 2 depicts an example of data structures that may be used to maintain the status of a stream of data packets.

FIG. 2 depicts an example of data structures that may be used to maintain the status of a stream of data packets. A stream descriptor 200 in combination with packet descriptors 250 may be an example of a source node data structure that is used to indicate the status of each stream of data packets. A stream descriptor may exist for each stream of ordered data packets on a source node. The stream descriptor may generally be a handle for a list, such as a linked list, of packet descriptors. Each packet descriptor may be associated with a data packet in the stream.

The stream descriptor 200 may contain several data fields. The tail field 202 may be a pointer that points to the last packet descriptor in the list of packet descriptors. The stream descriptor may also contain a next field 204 which is a pointer to the packet descriptor that is associated with the next data packet to be sent to the destination node(s). The stream descriptor may also include a stream node interface configuration indicator (SNICI) 206 that may be used to store the value of the NICI 130 as it existed at the time the last successful data packet was sent by the stream. The SNICI may also be referred to as the stored node interface configuration indicator. The stream descriptor may also include a count field 208 that may be used to keep a count of the number of data packets that have been sent for the stream but for which no acknowledgement from a destination node has been received. The stream descriptor may also include a restart pending field 210. When there has been a change in the node interface configuration status, the restart pending indicator may be set. When the restart pending field is set, the sending module 122-1 may not send additional data packets until certain conditions are satisfied. These conditions will be described below.

The packet descriptor 250 may also contain several data fields. The packet field 252 may identify the data packet that is associated with the packet descriptor. In an example implementation, the packet field may contain the actual data packet itself. In other example implementations, the packet field may contain a pointer to the location in memory where the data packet is stored. The packet descriptor may also include a next packet field 254. As data packets are received by a node and added to a stream, the stream descriptor may be updated. A newly received data packet may be associated with a packet descriptor and then added to the end of the list of packet descriptors. The tail field may then be updated so that once the next packet is received, it is known where to add the newly created packet descriptor.

When sending data packets, the source node may send the data packet that is associated with the packet descriptor pointed to by the next pointer. The next pointer may then be advanced to the packet descriptor pointed to by the next packet field of the packet descriptor associated with the data packet that was just sent. Because data packets are added in order of receipt to the stream descriptor, it is ensured that the data packets will be sent in the same order. Use of the stream descriptor will be described in further detail with respect to FIGS. 4(a-f).

Figure 3:
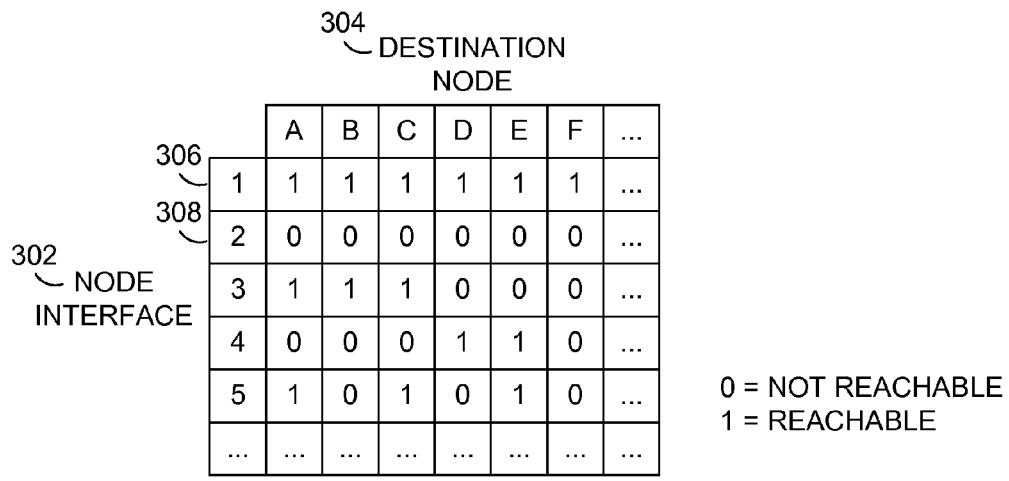
FIG. 3 depicts an example of a data structure that may be used to maintain the status of node interfaces.

FIG. 3 depicts an example of a data structure that may be used to maintain the status of node interfaces. In one example implementation, the status of the node interfaces may be maintained using a table. On one axis of the table, the node interfaces 302 may be listed. On the other axis, the destination nodes 304 may be listed. The intersection of a node interface with a destination node may contain a value that determines if the destination node is reachable using the specified node interface. For example, a value of zero may indicate that the destination node is not reachable, whereas a value of one indicates that the destination node is reachable.

In the example shown in FIG. 3, all destination nodes shown are reachable from node interface one 306, as is indicated by the value one shown for each destination node. In contrast, all destination nodes are not reachable from node interface two 308, as is indicated by the value zero shown for each destination node. Such a situation where all destination nodes are not reachable from a node interface may occur, for example, when that node interface has been taken out of service on the source node.

In some cases, a destination node may be reachable from one node interface, while not being reachable from a different node interface. As shown, destination node A may be reachable from node interface three, but is not reachable when using node interface four. Such a situation may occur, for example, when the node interface on the destination node that forms a communications channel with the node interface on the source node is taken out of service on the destination node.

Regardless of the reason why a destination node is or is not reachable when using a specific node interface, a table, as shown in FIG. 3 may be used to determine the current configuration of the node interfaces. The node interface configuration module may maintain this configuration. If there is any change in the configuration, such as a previously reachable node becoming unreachable, or vice versa, the table may be updated. In addition, the NICI may be updated anytime a change is made to the table. For example, in cases where the NICI is implemented as a counter, any change in the table depicted in FIG. 3 may result in the NICI counter being incremented. Use of the NICI when the configuration of node interfaces changes will be described in further detail below.

FIGS. 4(a-f) depict an example of sending data packets. There may be a stream of data packets 402 that are to be sent, in order, from a source node 410 to a destination node 420. As shown in FIG. 4(a), the source node may include a NICI 411 that may be implemented as a counter in one example implementation. As shown, the NICI 411 currently contains a value of one. The source node may begin to send the data packets, in order, to the destination node. As explained above, the current node interface configuration may be used to determine which node interface on the source node should be used to send the data packets. As long as the node interface configuration does not change, the same node interface may be selected, resulting in the data packets being sent in order to the destination node.

Figure 4A:
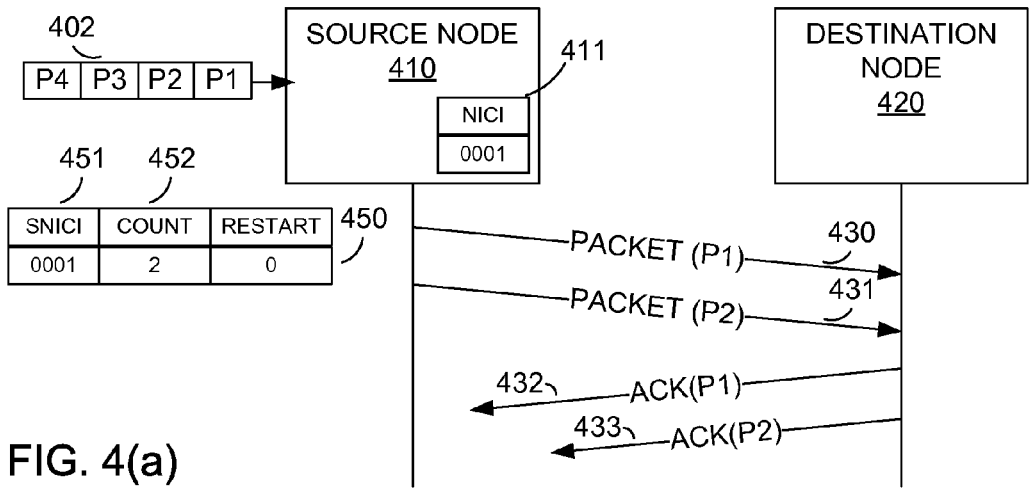
FIGS. 4(a-f) depict an example of sending data packets.

As shown in FIG. 4(a), data packets P1 and P2 may be sent to the destination node 420 in messages 430, 431. For purposes of this description, assume the count of unacknowledged data packets is zero at the time data packets P1 and P2 are sent. Use of the count of unacknowledged data packets will be described further below. Because those messages are sent over the same node interface, it may be assured that the data packets will arrive in order at the destination node 420. Stream descriptor 450 may be used to store data that may be used to ensure that data packets are received in the correct order. Whenever a data packet is sent from the source node, the current value of the NICI 411 is stored in the SNICI field 451 of the stream descriptor. This value may be used later to determine if the node interface configuration has changed. Furthermore, whenever a data packet is sent to the destination node, a count of unacknowledged data packets 452 is incremented. As shown, the count is currently two, because two data packets have been sent, but no acknowledgments have yet been received. The acknowledgement messages 432, 433 may have been sent from the destination node, but have not yet been received by the source node. For purposes of clarity, the tail and next pointer of the stream descriptor have been omitted, however it should be understood that these pointers are used as was described above.

Figure 4B:
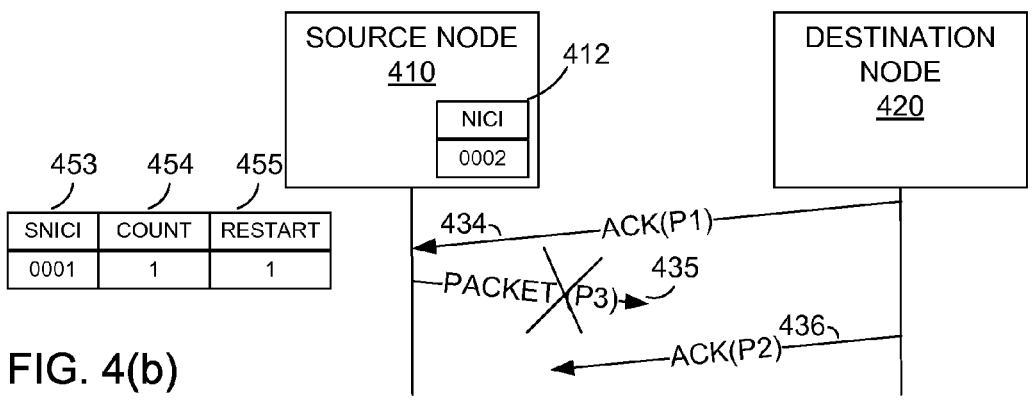

FIG. 4(b) is a continuation of the messages diagram of FIG. 4(a). At some point, an acknowledgement message for a data packet may be received. As shown in FIG. 4(b), the acknowledgement message 434 for data packet P1 may have been received. The acknowledgement message 436 for data packet P2 may still be in the process of being sent to the source node. It should be noted that although the data packets are sent in order, there is no requirement that the acknowledgement messages be received in order. Thus, it is entirely possible that the acknowledgement for data packet P2 is received before the acknowledgment message for data packet P1. When the acknowledgement for data packet P1 is received, the count 454 may be decremented to indicate that there is currently one unacknowledged data packet.

At some point between FIGS. 4(a) and 4(b) there may have been a change to the node interface configuration. For example, a destination node that was previously reachable may no longer be reachable, or vice versa. The change in the node interface configuration is reflected in the NICI value 412 of the source node. The source node may then attempt to send data packet P3 to the destination node. However, prior to sending the data packet, the source node may compare the value of the SNICI 453 that was stored when the last data packet was sent with the current value of the NICI 412 for the stream. If the values are not the same and there are currently unacknowledged data packets, the data packet may not be sent. As such, the message 435 for data packet P3 is not sent. Furthermore, the source node may set the restart pending indicator 455 for the stream. If the restart pending indicator is set, the source node may not send any additional data packets until certain conditions, described below, are met.

The reason that data packet P3 is not sent is because the SNICI value 453 stored when data packet P2 was sent is not the same as the current NICI value 412. In order to send data packet P3, the algorithm used to select a communications channel will be run. However, because there was a change in the node interface configuration, there can be no guarantee that the communications channel selected will be the same as the one used when data packets P1 and P2 were sent. Because the acknowledgement for at least one data packet, in this case data packet P2, has not yet been received, the source node does not know if the data packet has been received by the destination node. As far as the source node is concerned, the data packet may still be making its way through the switch fabric on the way to the destination node. If the selection algorithm were to choose a communications channel different than the one used to send data packets P1 and P2, the source node can no longer be assured that data packet P3 would be received by the destination node after data packet P2. As explained above, there is no ordering guarantee between different communications channels.

Thus, in order to ensure that data packets will be received by the destination node in order, when the current NICI does not equal the SNICI, and there is at least one unacknowledged data packet, the source node may discontinue sending data packets until there are no longer any unacknowledged data packets. The source node may set the restart pending field 455 for the stream. As long as the restart pending field is set, the source node will no longer issue any data packets for the stream.

Figure 4C:
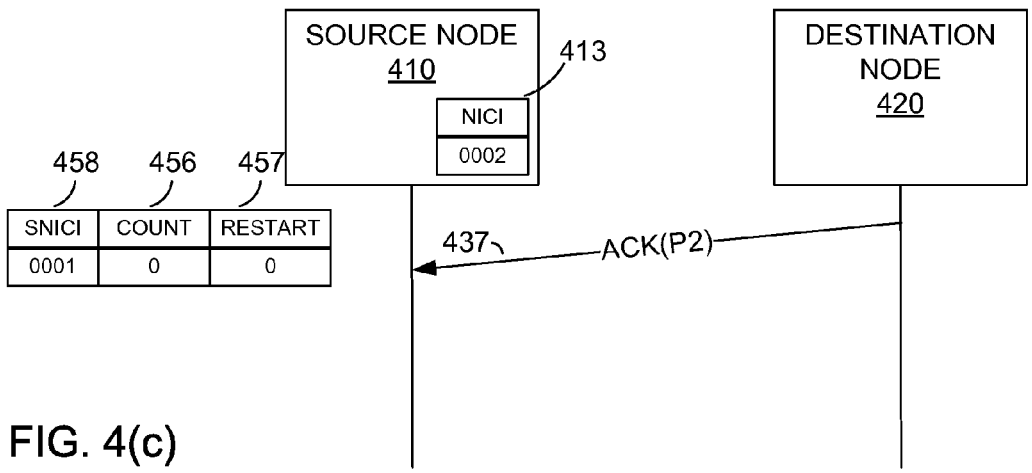

FIG. 4(c) is a continuation of FIG. 4(b). At some point in time, the acknowledgement 437 for the outstanding data packet, in this case data packet P2, may be received. At that point, the count 456 may be decremented to reflect the acknowledgement of the data packet. As shown in FIG. 4(c), the count is now zero, indicating that all data packets that have been sent by the source node have been acknowledged by the destination node. The source node may then clear the restart pending indicator 457 for the stream, which may allow the stream to being sending data packets again. The reason the restart pending indicator may be cleared when the count reaches zero is that there is no longer a possibility of data packets being received by the destination node out of order, even if a new communications channel is selected. This is because when the count is zero, it is not possible for any data packets to be currently "in flight" to the destination node. Even if a new communications channel is selected, there is no possibility that a newly sent packet will be received before an "in flight" data packet, as a zero count means there are no such packets.

Figure 4D:
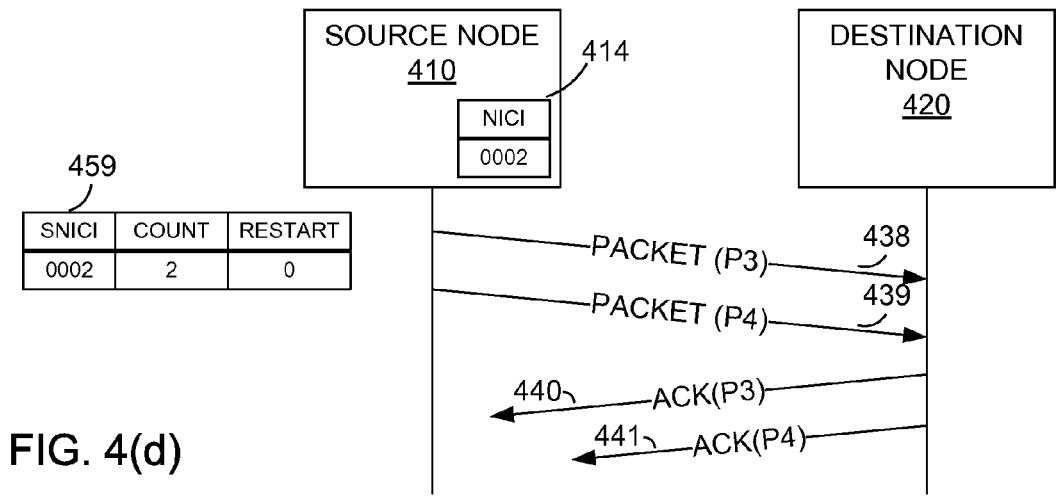

FIG. 4(d) is a continuation of FIG. 4(c). The source node may now proceed with sending data packets P3 and P4 in messages 438, 439. When the first message 438 is sent, the current value of the NICI 414 may be different from the SNICI value 458. However, because the count is zero, the source node may ignore the fact that the values of the SNICI and NICI are different, and simply store the current value of the NICI in the SNICI 459. As explained above, a count value of zero indicates no data packets are unacknowledged, thus even if a new communications channel is selected, there is no risk of data packets being received out of order. Acknowledgement messages 440, 441 may be sent from the destination node to the source node.

Figure 4E:
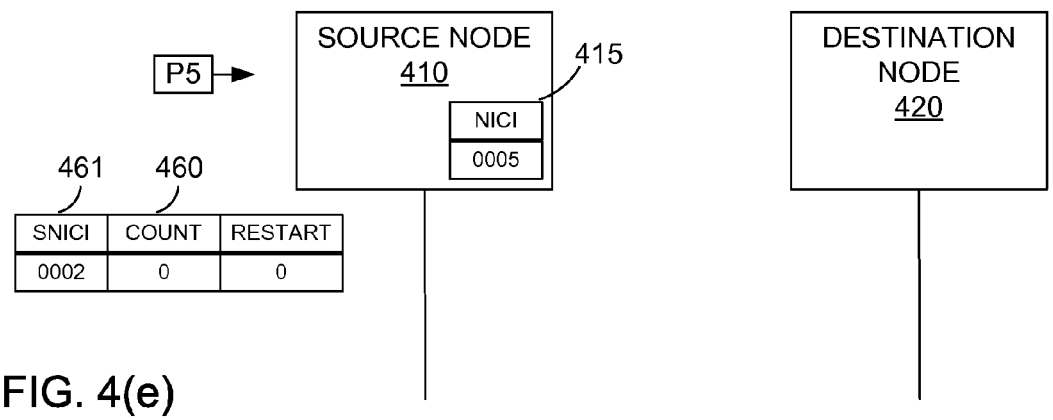

FIG. 4(e) is a continuation of FIG. 4(d). In FIG. 4(e), acknowledgement messages 440 and 441 may have been received by the source node, causing the count 460 of unacknowledged packets to return to zero. For purposes of explanation, assume that for a period of time, no new data packets are added to the stream. Thus, there are no additional data packets to send to the destination node. Also assume that there have been several changes to the node interface configuration, as reflected by the value of the current NICI 415.

At some point, a new data packet P5 may be received by the source node. The source node may attempt to send the data packet P5 to the destination node. The source node may compare the SNICI value 461 with the current NICI value 415. Because the values are different, the source node may examine the count field to determine if the data packet may be sent. Because the count field 460 is zero, the data packet P5 may be sent, for the reasons described above.

Figure 4F:
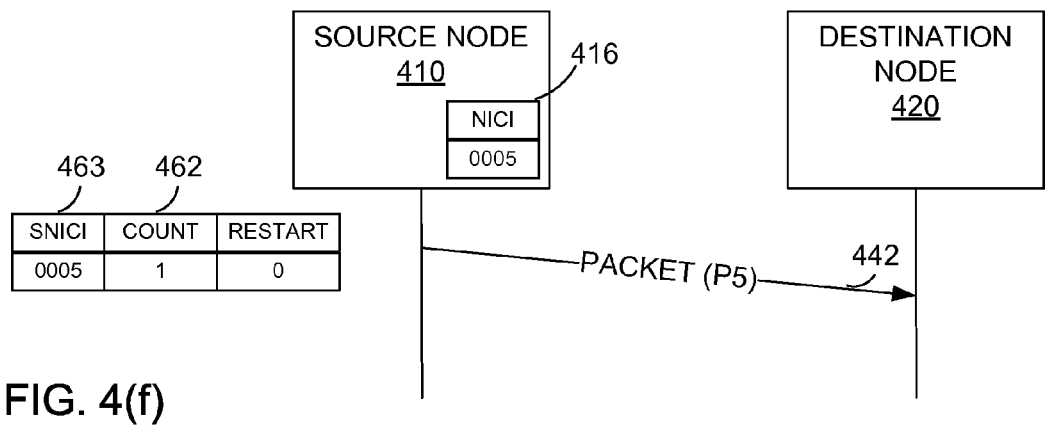

FIG. 4(f) is a continuation of FIG. 4(e). The source node may send data packet P5 to the destination node in message 442. The count field 462 may be incremented to indicate that there is an unacknowledged data packet that has been sent. Finally, the value of the SNICI 463 may be set to equal the current value of the NICI 416.

Although FIGS. 4(a-f) have been described in terms of a source node sending data packets to a single destination node, it should be understood that the process described above is equally applicable in cases where data packets are being sent to multiple destination nodes. If the source node determines that there has been a change in the NICI value and that there are unacknowledged data packets, the restart pending indicator may be set, preventing additional data packets from being sent, regardless of if they are being sent to a single or multiple destinations. Likewise, the count of unacknowledged data packets is only concerned with the fact that there may be data packets that are unacknowledged. It does not matter if the unacknowledged data packets were sent to a single node or to multiple nodes.

Figure 5:
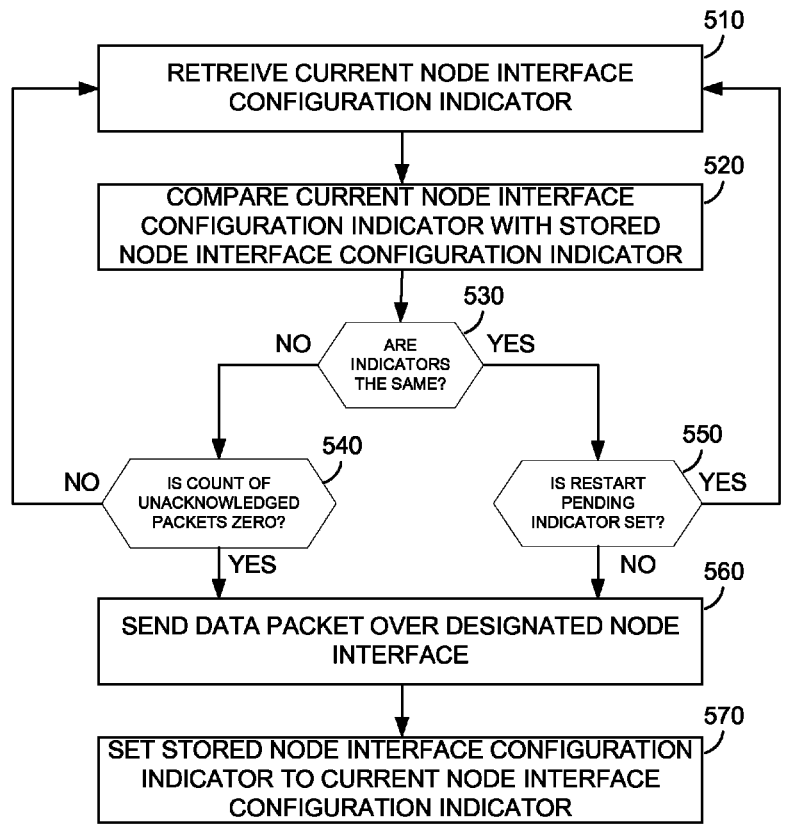
FIG. 5 depicts an example of a high level flow diagram for sending data packets.

FIG. 5 depicts an example of a high level flow diagram for sending data packets. In block 510 a current node interface configuration indicator may be retrieved at a source node. In block 520 the current node interface configuration indicator may be compared to a stored node interface configuration indicator. In block 530 it may be determined if the two indicators are the same. If the indicators are not the same, this may indicate that the node interface configuration has changed since the last time a data packet was sent from the node. The process then moves to block 540.

In block 540 it is determined if the count of unacknowledged data packets is zero. A count of zero may indicate that there are currently no data packets that have not yet been received by the destination node. If it is determined that the count of unacknowledged packets is not zero, the process returns to block 510 without sending a data packet. The reason being that there has been a change in the node interface configuration but there are still unacknowledged data packets which may prevent additional data packets from being sent. If the count of unacknowledged data packets is zero, the process moves to block 560, which will be described below.

If it is determined in block 530 that the indicators are the same, the process moves to block 550. In block 550 it is determined if the restart pending indicator is set. If the restart pending indicator is set, the process returns to block 510 without sending a data packet. No data packet may be sent because the restart pending indicator is set. Such a situation may occur, for example, when the node interface configuration indicator is implemented as a counter and the counter has rolled over. For example, with a modulus one counter, two changes to the node interface configuration may cause the counter to contain the same value, as each change toggles the counter. If the restart pending indictor is not set, the process moves to block 560.

In block 560 the data packet may be sent over the designated node interface. As explained above, the designated node interface may be determined based on the current configuration of the node interfaces. In block 570, the stored node interface configuration indicator is set to the current node interface configuration indicator. This allows the source node to determine if the node interface configuration has changed since the last time a data packet was sent.

Figure 6:
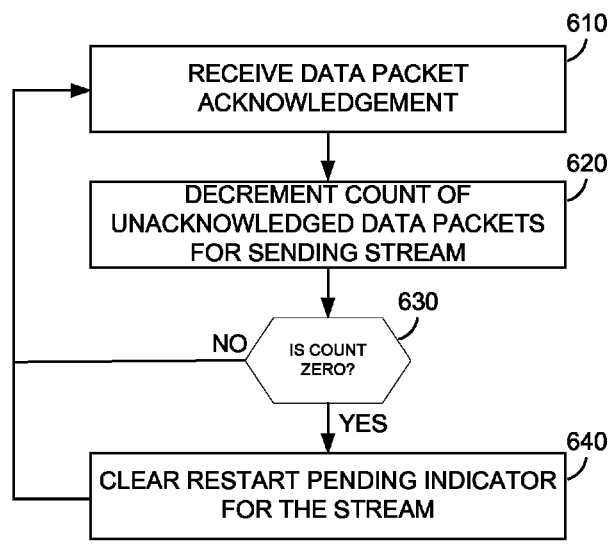
FIG. 6 depicts an example of a high level flow diagram for receiving acknowledgements.

FIG. 6 depicts an example of a high level flow diagram for receiving acknowledgements. In block 610 an acknowledgment of receipt of a data packet may be received. In block 620 the count of unacknowledged data packets for the stream that sent the data packet may be decremented. In block 630 it may be determined if the count of unacknowledged data packets for the stream has reached zero. If the count has not reached zero, the process returns to block 610. If the counter has reached zero, the restart pending indicator for the stream may be cleared. In some example implementations, the restart pending indicator is only cleared if it is currently set, while in other example implementations, the restart pending indicator is cleared regardless of the initial status. Clearing the restart pending indicator may allow the source node to begin sending data packets again.

Figure 7:
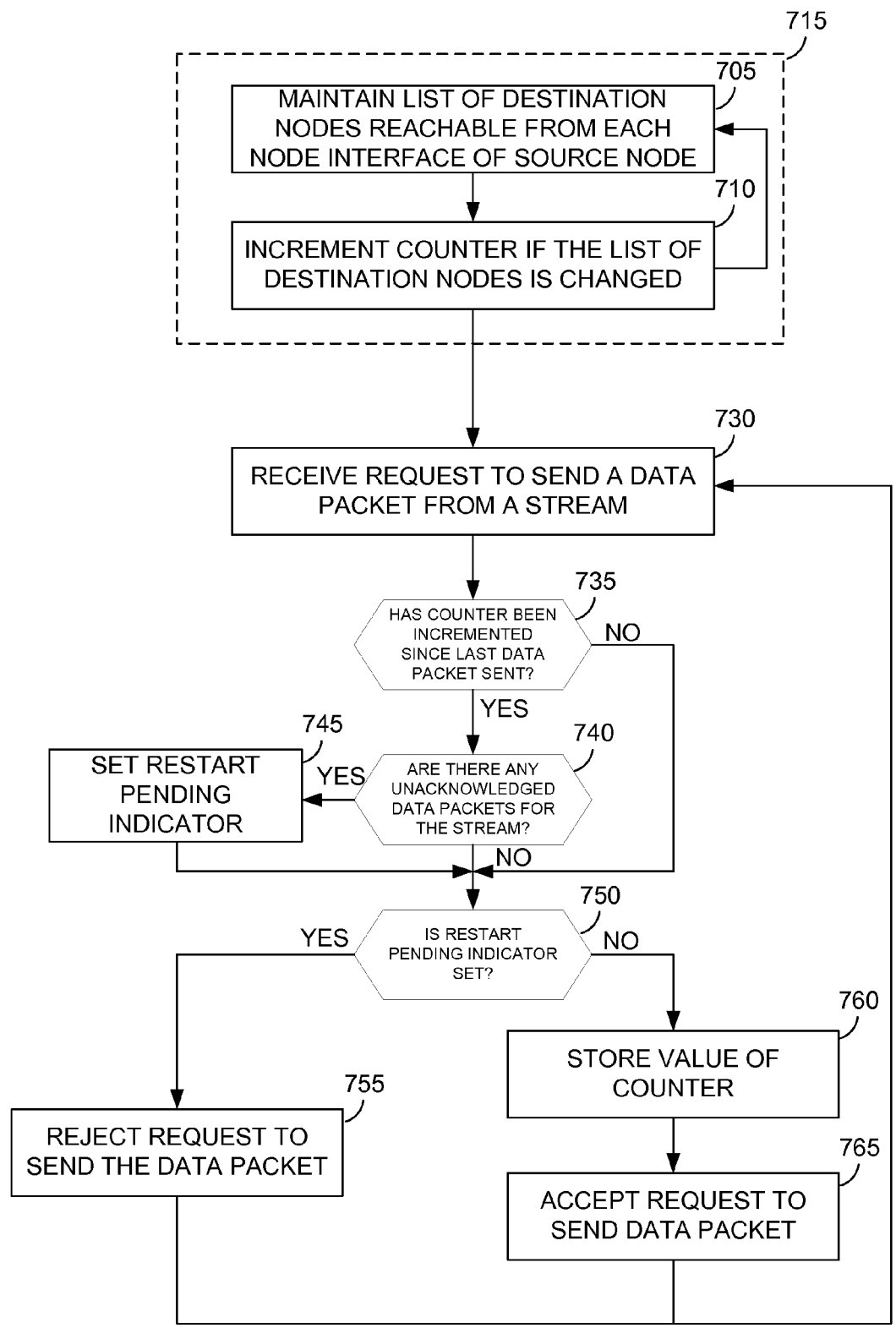
FIG. 7 depicts an example of a high level flow diagram for maintaining node interface status and sending data packets.

FIG. 7 depicts an example of a high level flow diagram for maintaining node interface status and sending data packets. In block 705 the source node may maintain a list of destination node that are reachable from each node interface of the source node. In block 710, a counter may be incremented if the list of destination nodes is changed. The process may then return to block 705. It should be understood that the blocks within the dashed lines 715 form a loop that is independent of the remainder of the flow diagram. In other words, the process of incrementing the counter whenever there is a change in the list of reachable destination nodes is independent of the remaining blocks of the diagram.

In block 730 a request to send a data packet from a stream may be received. In block 735 it may be determined if the counter has been incremented since the last data packet was sent. If the counter has been incremented, this may indicate that the node interface configuration has changed since the last time a data packet was sent. If the counter has not been incremented since the last data packet was sent, the process moves to block 750, which is described below. Otherwise, the process moves to block 740.

In block 740 it may be determined if there are any unacknowledged data packets for the stream. If not, the process moves to block 750, which is described below. If so, the process moves to block 745. In block 745 the restart pending indicator may be set. The restart pending indicator may be set because both the counter has been incremented indicating a change in the node interface configuration and there are unacknowledged data packets for the stream.

In block 750 it may be determined if the restart pending indicator is set. If so, the process moves to block 755. In block 755 the request to send the data packet is rejected because the restart pending indicator is set. If the restart pending indicator is not set, the process moves to block 760. In block 760 the value of the counter may be stored. The value may be stored so that it can be determined if when there has been a change in the node interface configuration. In block 765 the request to send the data packet may be accepted and the data packet may be sent.

I claim:

1. A method comprising:
   retrieving, at a sending node, a current node interface configuration indicator;
   comparing the current node interface configuration indicator with a stored node interface configuration indicator;
   sending a data packet over a designated node interface if the current and the stored node interface configuration indicators are the same and a restart pending indicator is not set; and
   setting the restart pending indicator if the current and the stored node interface configuration indicators are not the same.

2. The method of claim 1 further comprising:
   sending the data packet over the designated node interface if a count of unacknowledged data packets is zero.

3. The method of claim 1 further comprising:
   clearing the restart pending indicator when a count of unacknowledged data packets is zero.

4. The method of claim 3 further comprising:
   setting the stored node interface configuration indicator to the current node interface configuration indicator if the data packet is sent over the designated node interface.

5. The method of claim 4 wherein the current node configuration indicator is a counter whose value is incremented whenever there is a change to the current node interface configuration indicator of the sending node.

6. The method of claim 5 wherein the counter is a modulus one counter.

7. A method comprising:
   maintaining, at a source node, a list of destination nodes that are reachable from each node interface of the source node;
   incrementing a counter if the list of destination nodes is changed;
   receiving a request to send a data packet from a stream;
   rejecting the request from the stream to send the data packet to a destination node if the counter has been incremented and there are unacknowledged data packets for the stream.

8. The method of claim 7 further comprising:
   setting a restart pending indicator for the stream that initiated the request to send the data packet.

9. The method of claim 8 further comprising:
   rejecting the request to send the data packet if the restart pending indicator is set.

10. The method of claim 9 further comprising:
    accepting the request from the stream to send the data packet to the destination node if there are no unacknowledged data packets; and storing the value of the counter in a data structure associated with the stream when a request to send the data packet is accepted.

11. The method of claim 10 further comprising:
accepting the request from the stream to send the data packet when the stored value of the counter equals the value of the counter and the restart pending indicator is not set.

12. A device comprising:
a node interface configuration module to maintain a counter that is updated upon any change to the availability of a node interface;
a stream module to maintain a restart pending indicator for a stream and to store a value of the counter when a data packet is sent through the node interface; and
a sending module to send the data packet over the node interface when the stored value of the counter equals the counter and the restart pending indicator for the stream is not set.

13. The device of claim 12 wherein the sending module further sets the restart pending indicator for the stream when the stored value of the counter and the counter are not equal.

14. The device of claim 13 wherein the sending module further sends the data packet if a count of unacknowledged data packets is zero.

15. The device of claim 13 further comprising:
a receiving module to decrement a count of unacknowledged data packets for the stream when an acknowledgement is received and to clear the restart pending indicator when the count of unacknowledged packets reaches zero.

16. The device of claim 15 wherein the device is an application specific integrated circuit.

* * * * *